Nov. 9, 1926. 1,606,277
F. H. WAITE
MOTOR VEHICLE SANDING DEVICE
Filed May 5, 1926 2 Sheets-Sheet 1

Frank H. Waite
INVENTOR

BY
Charles A. Clark
ATTORNEY

Nov. 9, 1926.  1,606,277
F. H. WAITE
MOTOR VEHICLE SANDING DEVICE
Filed May 5, 1926  2 Sheets-Sheet 2

Frank H. Waite
INVENTOR

BY
Charles O. Clarke.
ATTORNEY

Patented Nov. 9, 1926.

1,606,277

UNITED STATES PATENT OFFICE.

FRANK H. WAITE, OF LONG ISLAND CITY, NEW YORK.

MOTOR-VEHICLE SANDING DEVICE.

Application filed May 5, 1926. Serial No. 106,876.

My invention relates to sanding devices utilized in motor vehicles and has for its object, a means for preventing the skidding of the vehicle on wet, greasy or icy roads.

One object of my invention is to provide a simple, compact, cheap and efficient means for applying sand under the wheels of motor vehicles.

Another object of my invention is to provide means for maintaining the sand or the like in a dry state by utilizing the exhaust gases of the vehicle for drying the same.

A further object of my invention is to provide a simple, durable, attachable device which is adapted to blow sand under the wheels of the vehicle by means of the pressure of the exhaust gases.

A still further object of my invention lies in the adaptability of the device to be operated either by an individual hand lever, the brake lever, or the accelerator.

It is well known that there are sanding devices used on street cars, railroads and vehicles running on rails but there are none that contemplate the unique combination of novel elements utilized in producing the remarkable results obtained by this particular device.

With these and other objects in view, my invention consists of the novel construction, arrangement and formation of parts, hereinafter referred to and specifically described, claimed and illustrated in the accompanying drawings, wherein similar numerals refer to like parts throughout the several views, in which:—

Figure 1:
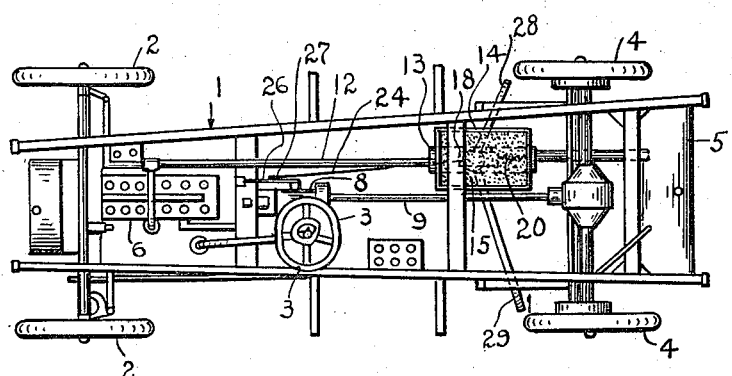
Figure 1, is a plan view of a typical automobile illustrating the device applied to the muffler.

Figures 1, 2, 3 and 5, illustrate the device as applied to a motor vehicle in which the chassis 1, with front wheels 2, steering wheel 3, rear wheels 4, and gas tank 5, carries an engine 6, fly wheel 7, gear shift 8, drive shaft 9, driving the rear wheels 4, through the gearing 10, and the rear axle 11.

The exhaust pipe 12, connected to the engine 6, carries a muffler 13, having a casing or box 14, in which the sand 15, is kept dry and hot by the heat of the exhaust gases in the muffler 13.

Figure 2:
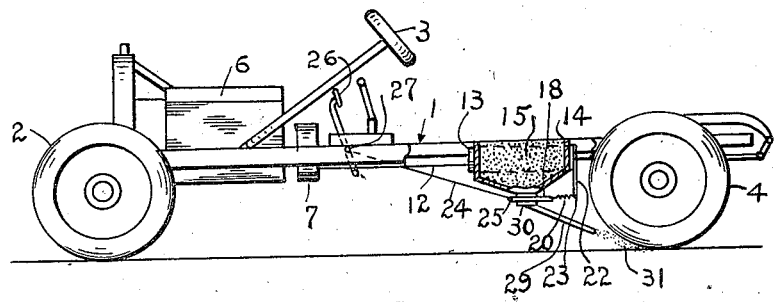
Figure 2, is a side elevation and partial section of Fig. 1.
Figures 4, 5:
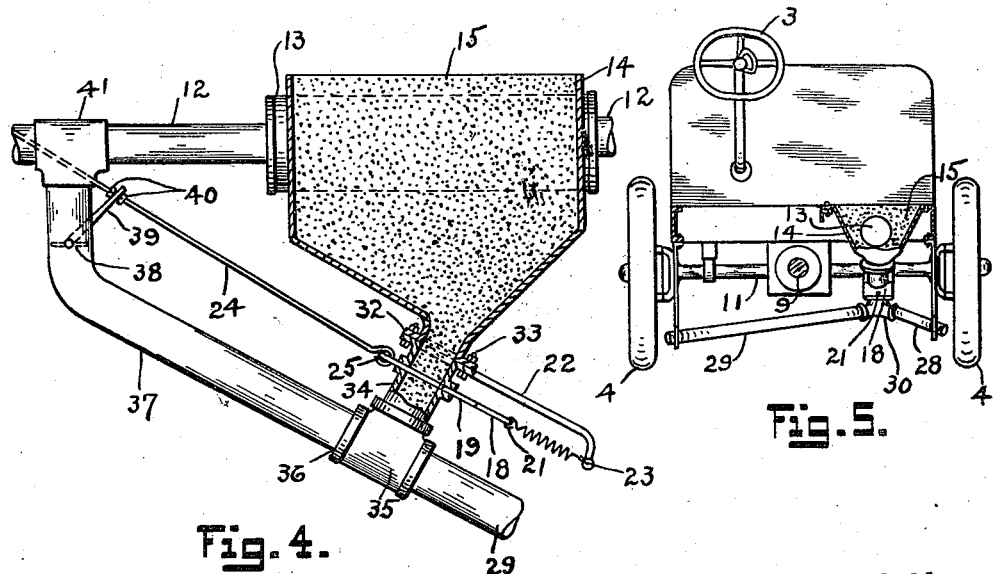
Figure 4, is an enlarged view of the device shown in Fig. 3.
Figure 5, is a cross section of Figure 1.

Figures 1, 2, and 5, illustrate a device wherein the sand 15, is delivered under the wheels 4 by gravity.

In these figures the casing 14, has an extension 16, on the hopper like bottom 17, provided with a slide 18, having a hole 19, therein.

This slide 18, is held in the closed position by a spring or the like 20, one end of which is fastened to the slide 18, at 21, and the other end to a supporting arm 22 at 23.

The slide 18, can be operated either by a rod or wire 24, connected at one end to the slide 19, at 25 and the other end to an operating arm 26, which arm may be an individual arm, the brake lever or the accelerator.

Figure 3:
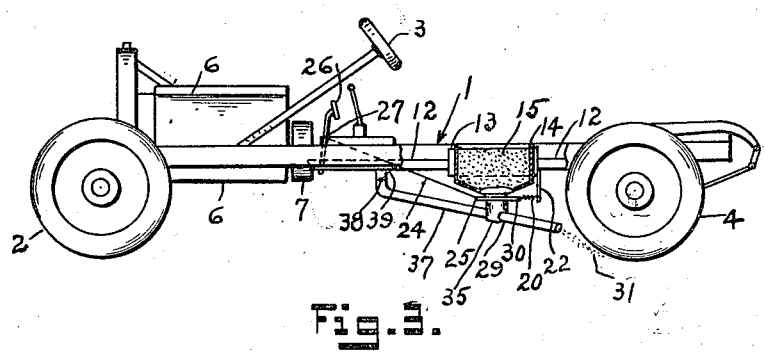
Figure 3, is a side elevation and partial section illustrating the device operated by the exhaust gases.

In Figures 1, 2 and 3, this rod or wire 24, is shown connected at 27, to the accelerator 26, which is operated by the foot.

It is obvious that this rod or wire could be operated by an individual hand lever or connected to the brake lever.

When the sand 15, is released by the opening of the slide 19, the sand will flow through the pipes 28 and 29, after passing through the fitting 30, and be finally delivered beneath the rear wheels 4, as shown at 31, in Figures 2 and 3.

In Figures 3 and 4, the sand is blown under the wheels by the exhaust gases.

The casing 14, in Figure 4, flanged at its lower portion 32, is connected by the bolts 33, to a valve 34, which carries the slide 18, at its central portion and a side outlet Y 35, on the lower end.

The outlets of the Y are connected to the pipes 28 and 29 and the inlet 36, to a pipe 37, which carries a valve 38, operated by the lever 39, and manually or pedally movable by the rod or wire 24, controlled by the stops 40, on the rod or wire 24.

The pipe 37, with its valve 38, is connected to the exhaust pipe 12, through the T 41, in the exhaust pipe 12.

In practice, when the rod or wire 24, is moved, the slide 18, will open, allowing the sand 15, to flow into the Y 35, through the hole 19, in the slide 18, and simultaneously the valve 38, will open, allowing the gas from the exhaust pipe 12, to flow into the pipe 37, and Y 35, where it carries the sand 15, therein and ejects it forcibly under the wheels 4, through the pipes 28 and 29.

It is obvious that pipes could be connected to this sand box to deliver sand either by gravity or under pressure beneath any or all of the wheels of the vehicle and that the sand box 14, could be built adjacent to any suitable means for heating the sand.

Also that this sand could be utilized under pressure as a means for extinguishing gasoline fires by connecting a hose to either of the pipes 28 or 29 and directing the same sand spray into the fire.

Having thus described and illustrated the preferred embodiment of my invention, I do not wish to limit myself to the exact construction shown, since it is evident that modifications may be made without departing from the spirit of the invention or scope of the claims.

I claim:—

1. In combination with a motor vehicle, a sand box, built around the muffler, said sand box provided with a sliding valve having a distributing means in connection thereto, directed to flow sand under pressure beneath the wheels of said vehicle, means connected with the distributing means and the exhaust pipe, having a valve therein and manually operable means operating simultaneously the two valves aforesaid.

2. In combination with a motor vehicle, a sand box provided with heating means and a slidable valve, distributing means directing sand to flow beneath the wheels of said vehicle, means connecting said distributing means with the exhaust pipe, having a normally closed valve therein, a pedally operable means operating the two valves aforesaid, simultaneously and means returning said valves to the closed position.

3. In combination with a motor vehicle, a sand box provided with a heating means and a slidable, normally closed valve, a distributing means directing sand to flow beneath the wheels of said vehicle, means connecting the distributing means and the exhaust pipe having a valve therein, means simultaneously operating the valves aforesaid and means returning said valves to the closed position.

4. In combination with a motor vehicle, a sand box adjacent to a heating means, means to flow sand under pressure therefrom, pedally or manually operable means simultaneously operating a sand valve and a pressure means valve, and a manually operable flexible means directing said sand to flow in any desired direction.

Signed at Long Island City in the county of Queens and State of New York this 4th day of May A. D., 1926.

FRANK H. WAITE.